(12) United States Patent
Bober et al.

(10) Patent No.: US 12,476,999 B2
(45) Date of Patent: Nov. 18, 2025

(54) MANAGING OPERATION OF EDGE DEVICES USING PLAYBOOKS

(71) Applicant: Dell Products L.P., Round Rock, TX (US)

(72) Inventors: Roman Bober, Ashdod (IL); Eyal Porges, Jerusalem (IL); Doron Bokobza, Mishmar HaNegev (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/646,116

(22) Filed: Apr. 25, 2024

(65) Prior Publication Data

US 2025/0337769 A1   Oct. 30, 2025

(51) Int. Cl.
*H04L 9/40* (2022.01)
*G06F 11/07* (2006.01)

(52) U.S. Cl.
CPC ...... *H04L 63/1441* (2013.01); *G06F 11/0709* (2013.01); *G06F 11/0793* (2013.01)

(58) Field of Classification Search
CPC ............... G06F 11/0709; G06F 11/079; G06F 11/0793; G06F 11/3676–3696; H04L 63/1441
See application file for complete search history.

(56) References Cited

U.S. PATENT DOCUMENTS

| | | | |
|---|---|---|---|
| 10,795,649 B1 * | 10/2020 | Drake | H04L 63/101 |
| 10,949,287 B2 * | 3/2021 | Laing | G06F 11/0793 |
| 11,563,755 B2 * | 1/2023 | Narula | G06N 20/00 |
| 2025/0106247 A1 * | 3/2025 | Chamaraju | H04L 63/1483 |

* cited by examiner

*Primary Examiner* — Joseph R Kudirka
(74) *Attorney, Agent, or Firm* — WOMBLE BOND DICKINSON (US) LLP

(57) ABSTRACT

Methods and systems for managing edge devices are disclosed. The edge devices may be managed using playbooks. The playbooks may be used to manage operation and security of edge devices. The playbooks may be generated by the edge devices and include implementation mapping and vulnerabilities mapping of software on the edge devices. For an issue of an edge device of the edge devices, an administrator may include a change to a code base of the software in the playbook. The change to the code base of the software in the playbook may initiate generation of a new playbook that includes the change.

20 Claims, 5 Drawing Sheets

MANAGING OPERATION OF EDGE DEVICES USING PLAYBOOKS

FIELD

Embodiments disclosed herein relate generally to managing edge devices. More particularly, embodiments disclosed herein relate to managing operation of edge devices using playbooks.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
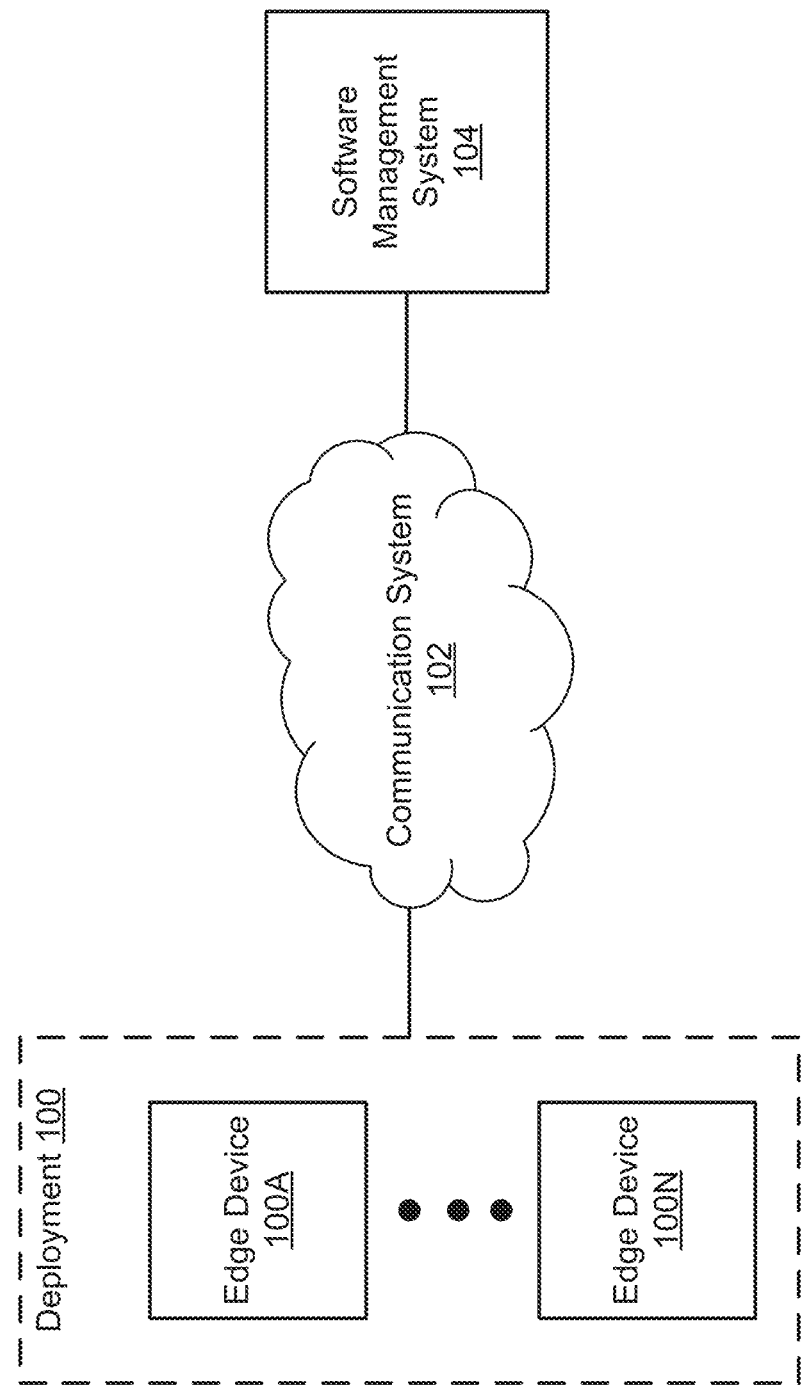
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing edge devices. The edge devices may be managed using playbooks. The playbooks may be used to manage operation and security of edge devices.

Edge devices may be computing devices that operate in remote environments. Operation in remote environments by the edge devices may require minimal human involvement. To operate securely with minimal human involvement, management of the edge devices may require utilization of playbooks.

Playbooks may include implementation mapping and vulnerabilities mapping for software on the edge devices. The implementation mapping may include charting of functionality of software on the edge devices. Vulnerabilities mapping may include tests for security and operation of the software and responses to the tests. Information on the software as well as the implementation mapping and the vulnerabilities mapping may be included in the playbook.

In an event of a software issue on an edge device of the edge devices, an administrator may use the playbook. The playbook may be used by the administrator to make a change to a code base of the software in the playbook to mitigate an impact of the issue. Upon making the change in the playbook, a software update may be initiated for the software in the edge device. To incorporate the change, new instances of implementation mapping and vulnerabilities mapping may be generated and included in a new playbook.

In an embodiment, a method for managing edge devices is disclosed. The method may include (i) identifying an issue regarding an edge device of the edge devices; (ii) obtaining a playbook for the edge device; (iii) evaluating, using the playbook, at least one potential change to the playbook to identify at least one acceptable change to the playbook; (iv) obtaining, using the at least one acceptable change, a new playbook for the edge device; and (v) updating operation of the edge device using the new playbook to mitigate an impact of the issue on the edge device.

The issue regarding the edge device may be based on a vulnerability expressed by the edge device and/or an undesired operation by the edge device.

The playbook may be usable to map issues to software hosted by the edge device, and the playbook may be usable to map how changes to portions of the software will impact functionality of other portions of the software.

The playbook may define the software that is hosted by the edge device and that dictates operation of the edge device.

The playbook may specify issue mappings between issues and portions of the software, and dependency mappings between the portions of the software and the other portions of the software.

Evaluating at least one potential change to the playbook may include (i) proposing, by an administrator, a set of changes based on the issue; (ii) identifying, using the playbook, at least one consequence of applying the set of the changes to the edge device; (iii) making a determination regarding whether the at least one consequence is acceptable; (iv) generating, based on the set of the changes and the playbook, a new playbook, in a first instance of the determination where the at least one consequence is acceptable; and (v) proposing, by the administrator, a new set of changes based on the issue, in a second instance of the determination where the at least one consequence is not acceptable.

The at least one potential change may be a change in operation of the software that is listed in the playbook and present on the edge device.

Obtaining the new playbook for the edge device may include (i) identifying a portion of the playbook based on the at least one acceptable change; and (ii) updating the portion of the playbook.

The new playbook may include the at least one acceptable change.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, data processing systems that provide the computer implemented services must operate in a predetermined manner. To operate in the predetermined manner, the data processing systems may need to host certain software component and/or have certain configurations settings in place. The software and/or the configuration settings of the computer may be known to enable the computer implemented services to be provided.

Over time, an issue may arise that may impact abilities of the data processing systems to provide the computer implemented services. For example, the impact may cause one or more changes to operation on the data processing systems. The one or more changes to the operation on the data processing system may be undesired because they may prevent or limit the data processing systems to provide the computer implemented services. The issue may be deployment of new software to the data processing systems.

To remediate the operation of the data processing systems to mitigate the impact on the ability of the data processing systems to provide the computer implemented services, issues may be addressed. To address the issue, the operation and/or configuration of the data processing systems may be modified.

However, the process of selecting how to modify the operation of the data processing systems in a manner that results in desirable operation of the data processing systems may be challenging. For example, the data processing systems may show various pieces of software that depend on one another. Consequently, a change to one piece of software may have far reaching and difficult to predict impacts on other pieces of software. Accordingly, effects of modification to the operation of the data processing system may be difficult to identify prior to making the changes in operation.

In general, embodiments disclosed here relate to systems and methods for managing edge devices. The edge devices may be managed by generating and maintaining playbooks. A playbook may include information regarding how a data processing system is to be managed, requirements for proper operation of the edge device, common issues and possible causes, dependencies and/or other relationships between various software components hosted by edge devices, and/or other information usable to manage the edge devices in an efficient manner.

When an issue regarding an edge device is identified, the playbook may be used to efficient remediate the issue. For example, the playbook may be used to identify various software components that may be impacted by the issue, may allow for various scenarios regarding potential changes in operation of the edge devices to be evaluated, etc.

To obtain playbooks, software components may be analyzed when they are created. For example, the source code for software components may be syntactically (or otherwise) analyzed to identify (i) dependencies between software components, (ii) other types of relationships between software components, etc. Further, over time, as issues such as vulnerabilities are identified, the software components may be further analyzed to identify various features, portions, etc. of the software components that are impacted (e.g., made exploitable) by the issues. This information may be added to the playbooks, along with the various relationships identified at creation time (e.g., when approved for use with edge devices). In this manner, information for any number of software components may be added to playbooks for different data processing systems.

When the software components hosted by an edge device are changed, a new playbook for the edge device may be generated.

To provide the above noted functionality, the system may include deployment 100, and software management system 104. Each of these components is discussed below.

Deployment 100 may include any number of edge device 100A-100N. Edge device 100A-100N may be expected to operate in a manner defined by a playbook. During the operation, edge device 100A-100N may use software and/or dependencies listed in the playbook. The playbook may map code for the software and/or the dependencies and potential vulnerabilities of edge device 100A-100N. When a vulnerability may be identified with edge device 100A-100N, a change to the code in the playbook may be made. If the change to the code in the playbook may be determined to be acceptable, then the operation of edge device 100A-100N may be updated by updating the software and/or the dependencies used by edge device 100A-100N. A new playbook may be generated to include the update to the software and/or the dependencies used by edge device 100A-100N.

Software management system 104 may generate the playbook with a software update. The software update may originate from confirmation of an acceptable change to a previous version of the playbook. Software management system 104 may store the playbook with the software update, the previous version of the playbook, and all other versions of the playbook. After the playbook with the software update has been generated, software management system 104 may find a vulnerability on edge device 100A-100N. To address the vulnerability, software management system 104 may determine a change to make in the code in the playbook based on instructions and recommendations in the playbook. If the change is determined to address the vulnerability, then the change may be acceptable. Software management system 104 may generate a new playbook with the change, make the change in the code in edge device 100A-100N, and store the new playbook with all other versions of the playbook.

Figure 2A:
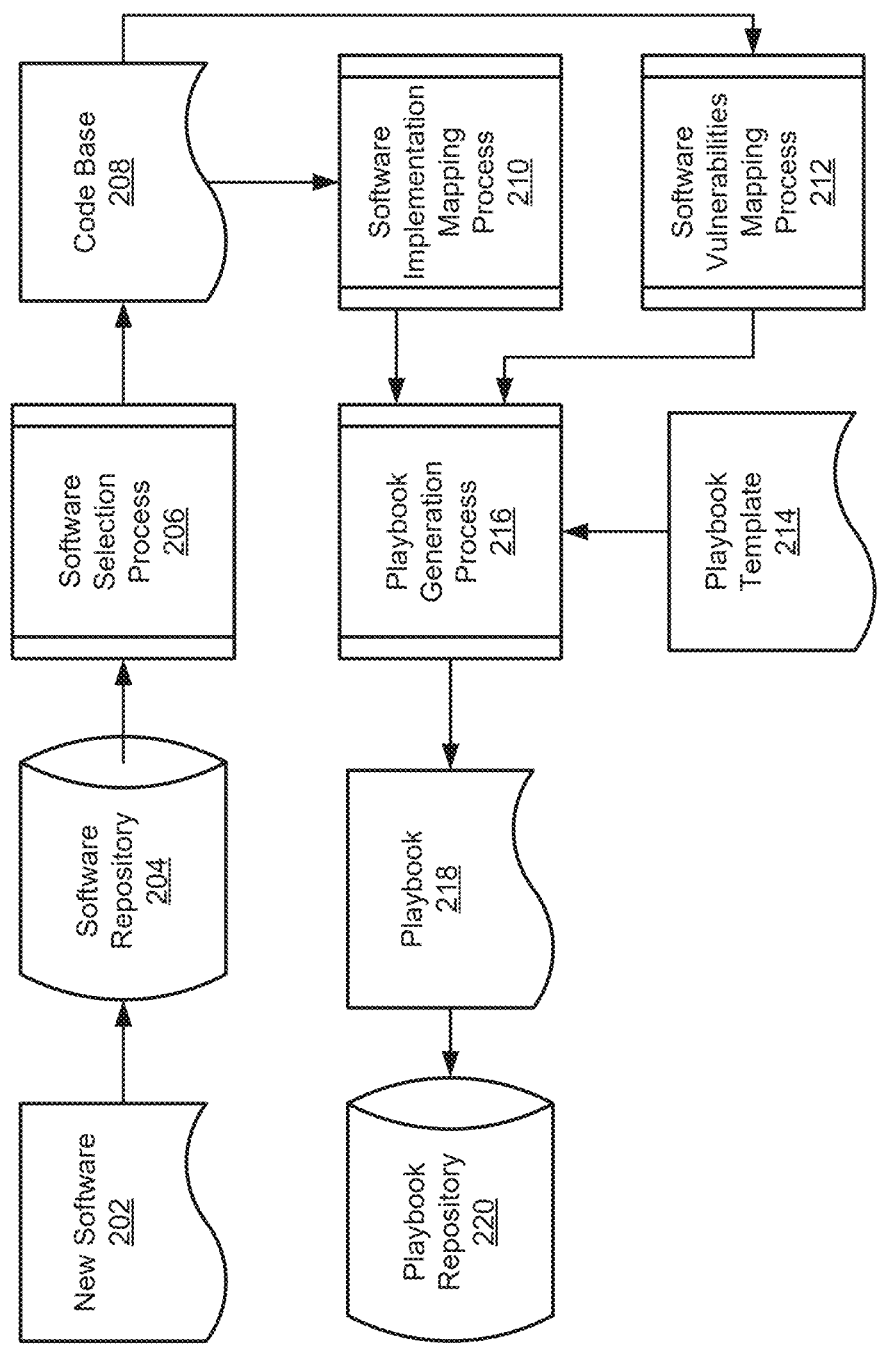
FIGS. 2A-2B show data flow diagrams illustrating operation of a system in accordance with an embodiment.
Figure 2B:
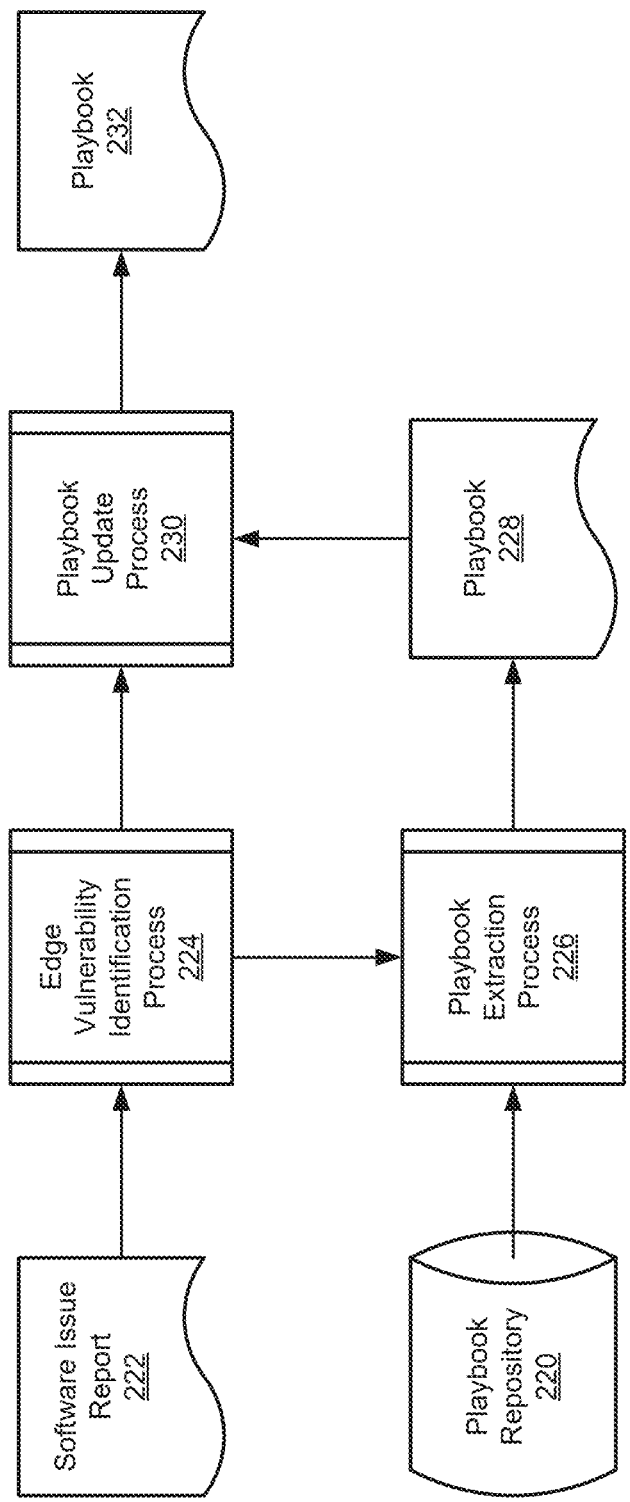
Figure 3:
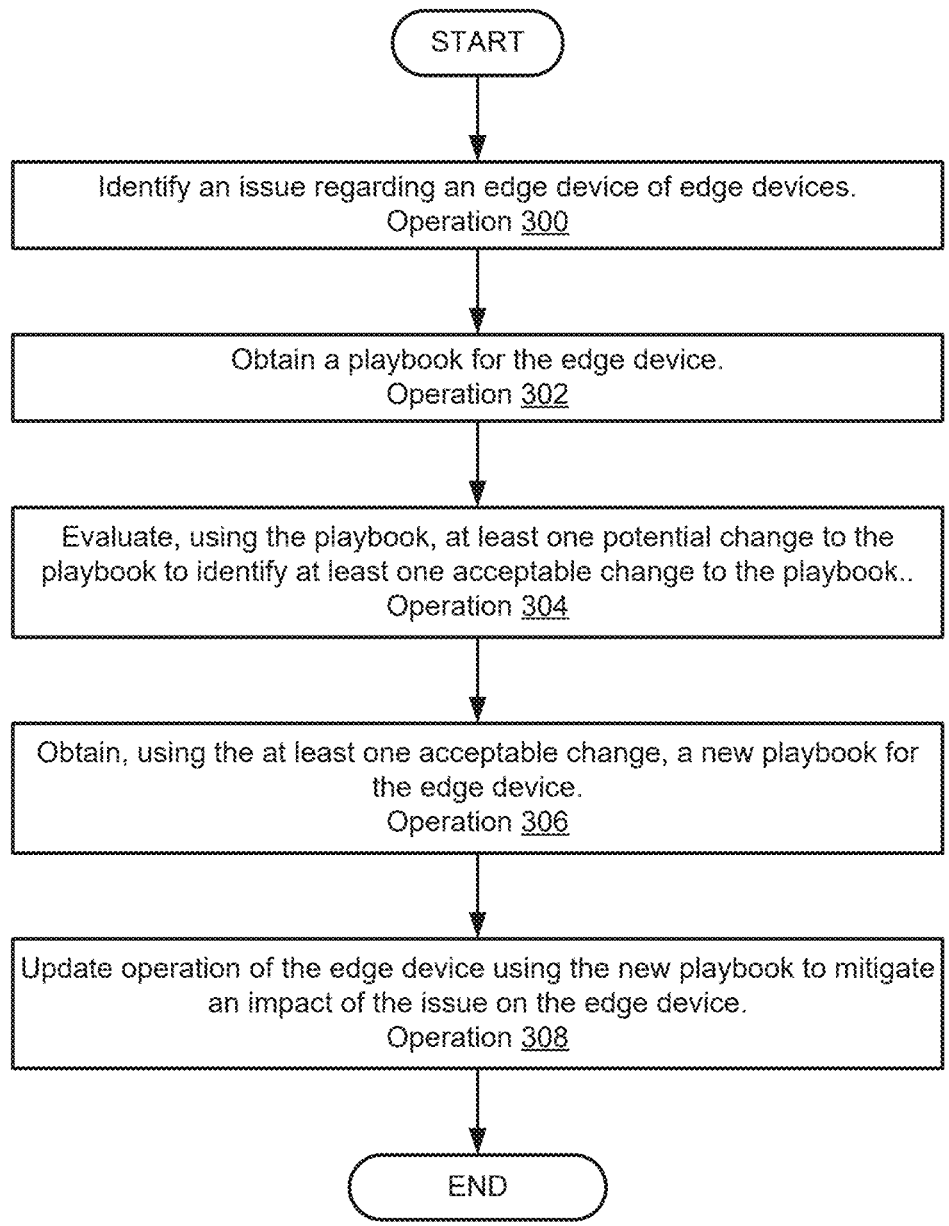
FIG. 3 shows flow a diagram illustrating a method in accordance with an embodiment.

While providing their functionality, any of deployment 100 and software management system 104 may perform all, or a portion, of the flows and methods shown in FIGS. 2A-3.

Any of (and/or components thereof) deployment 100 and software management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 202, 208, etc.) is used to represent data structures, a second set of shapes (e.g., 206, 210, etc.) is used to represent processes performed using and/or that generate data, and a third set of shapes (e.g., 204, 220, etc.) is used to represent large scale data structures such as databases.

Turning to FIG. 2A, a first data flow diagram in accordance with an embodiment is shown. The first data flow diagram may illustrate data used in and data processing performed in generation of a playbook.

To generate a playbook, software selection process 206 may be performed. During software selection process 206, new software 202 may be obtained. New software 202 may be obtained from the Internet, a database, a software developer, and/or any other source. New software 202 may include modifications to a code base of software that may be used by an edge device and/or new software that may not yet be present on the edge device. Upon obtaining new software 202 from the Internet, a database, and/or any other source, new software 202 may be added to software repository 204.

Software repository 204 may include any software that has been installed on the edge device. Any of software that has been installed on the edge device may include previous and current versions of the software. Updates to the software and/or new software may be received by software repository 204 as new software 202 from the Internet, a database, and/or any other source.

After receiving new software 202 by software repository 204, new software 202 may be extracted from software repository 204. New software 202 may be extracted to fulfill a software update on the edge device. New software 202 may include code base 208 for software that may be present on an edge device and/or new software that may not yet be present on the edge device. Code base 208 may include modified functionality for the software that may be present on the edge device and/or new functionality from the software that may not yet be present on the edge device. Functionality may be modified for the software by adding new code base and/or removing code base from the software. Code base 208 may be included in new software 202 to be installed on an edge device.

To identify the functionality within code base 208, software implementation mapping process 210 may be performed. During software implementation mapping process 210, all lines of code within code base 208 may be traversed. The lines of code within code base 208 may be traversed by charting the functionality of each of the lines of the code. The functionality of each of the lines of the code may be charted by surveying the code in a line-by-line manner. By surveying the lines of the code of code base 208 in the line-by-line manner, capabilities of new software 202 may be revealed.

In addition to performing software implementation mapping process 210, software vulnerabilities mapping process 212 may be performed. During software vulnerabilities mapping process 212, all lines of code within code base 208 may be traversed upon testing for vulnerabilities. To test for vulnerabilities within code base 208, code base 208 may be evaluated using scenarios to understand responses of code base 208. The scenarios may include, for example, (i) examining logic of and interrelations between code base 208, (ii) inputting incorrect values into functionality within code base 208 and evaluating, (ii) omitting lines of code within code base 208 to remove the functionality, (iv) performing different combinations of inputs into the functionality within code base 208, (v) monitoring for changes in code base 208, (vi) assessing an impact of changes and inputs in code base 208, and (v) recording the changes in code base 208. For each scenario, the responses from code base 208 may be evaluated. The responses by code base 208 may be evaluated to assess potential vulnerabilities in new software 202.

After performing software implementation mapping process 210 and software vulnerabilities mapping process 212, playbook generation process 216 may be performed. During playbook generation process 216, implementation mapping of code base 208 along with the scenarios and the responses in software vulnerabilities mapping process 212 may be added to playbook template 214.

Playbook template 214 may include a blueprint for generating a playbook. The blueprint may be used for new software 202 with a software update to the edge device. To use new software 202, information may be extracted from new software 202 and input into playbook template 214. The information on new software 202 may include hardware, software and security requirements for new software 202. In addition, from playbook generation process 216, capabilities of new software 202 from software implementation mapping process 210 may be listed in playbook template 214. Finally, from software vulnerabilities mapping process 212, the scenarios and the responses from the testing for the vulnerabilities may be listed in playbook template 214. The scenarios and the responses from the testing for the vulnerabilities may be used to anticipate operational and security weaknesses in new software 202 in the edge device.

Playbook template 214 may include (i) the purpose of the playbook, (ii) an overview of edge device 100A-100N components, (iii) details on the importance of edge computing in the field, and (iv) setup of edge device 100A-100N, (v) details of hardware and software components, (vi) instructions for setup of edge device 100A-100N, (vii) network configurations of edge device 100A-100N, (viii) security considerations for edge device 100A-100N, (xi) instructions for encryption and communication protocols in edge device 100A-100N, (x) instructions for data collection and storage from edge device 100A-100N, (xi) guidelines for managing, deploying, and troubleshooting applications on edge device 100A-100N, (xii) instructions for monitoring, maintenance, and diagnostics of edge device 100A-100N, (xiii) common issues and possible root causes, (xiv) a section for frequently asked questions and responses about edge device 100A-100N, (xv) additional resources for further understanding about edge device 100A-100N, and/or other types of information that may be used in managing edge devices.

After ingestion of the information on new software 202, the implementation mapping from playbook generation process 216 and the vulnerabilities mapping from software vulnerabilities mapping process 212, playbook 218 may be generated. Playbook 218 may be used by an administrator in an event that an issue may be found with new software 202 on the edge device. To understand the issue, the administrator may use implementation mapping in the playbook to, for example, understand code base 208 to find a source of an issue. Upon understanding code base 208 and finding the source of the issue, the administrator may use implementation mapping and vulnerabilities mapping to determine an acceptable change to the software and then update playbook 218. An update of playbook 218 may initiate generation of a new playbook.

To access playbook 218, the administrator may obtain playbook 218 from playbook repository 220. Within playbook repository 220, playbook 218 may exist for each software update associated with new software 202.

Turning to FIG. 2B, a second data flow diagram in accordance with an embodiment is shown. The second data flow diagram may illustrate data used in and data processing performed in updating a playbook based on a software issue.

To update the playbook based on the software issue, edge vulnerability identification process 224 may be performed. During edge vulnerability identification process 224, software issue report 222 may be received. Software issue report 222 may include an issue with an edge device that causes an impact on the performance of the edge device. The impact may cause an undesired operation by the edge device and therefore the edge device may perform in an undesired manner.

Upon receiving software issue report 222, an administrator may continue edge vulnerability identification process 224. To continue edge vulnerability identification process 224, the administrator may identify a code base for the software on the edge device impacted by the issue. Once the administrator identifies the code base having the issue, playbook extraction process 226 may be performed.

During playbook extraction process 226, playbook 228 may be extracted from playbook repository 220. Playbook 228 may include information on the software impacted by the issue as well as implementation mapping and vulnerabilities mapping for the code base associated with the software impacted by the issue. The information on the software may include hardware, software and security requirements for the software. The implementation mapping may be used by the administrator to understand the capabilities of the software. The capabilities of the software include the functionality present in the code base of the software. The vulnerabilities mapping may be used to understand where the capabilities and security in the software may have weaknesses. With playbook 228, playbook update process 230 may be performed.

During playbook update process 230, the administrator may generate a potential change in the code base of the software impacted by the issue. The potential change may be at least one change in the code base of the software impacted by the issue. An effect of the at least one change may be determined by the administrator to be an acceptable change by following the implementation mapping and vulnerabilities mapping in playbook 228. Based on the implementation mapping and the vulnerabilities mapping in playbook 228, if the administrator determines that the potential change is the acceptable change, then the administrator may implement the acceptable change in the code base of the software in the playbook. Otherwise, if the administrator determines that the potential change is not the acceptable change, then the administrator may select a new potential change.

Once the acceptable change has been implemented, a software update may be performed. The software update may include implementing data flows described in FIG. 2A. Upon implementing the data flows described in FIG. 2A, playbook 232 may be generated. Playbook 232 may include implementation mapping and vulnerabilities mapping of the code base that includes the acceptable change to the code base of the software.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage power consumption in data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing edge devices in accordance with an embodiment is shown. The method may be performed, for example, by any of the components of the system of FIG. 1, and/or other components not shown therein.

At operation 300, an issue may be identified regarding an edge device of edge devices. The issue may be identified by receiving a software issue report.

At operation 302, a playbook may be obtained for the edge device. The playbook may be obtained by extracting the playbook from a playbook repository.

At operation 304, at least one potential change to the playbook, using the playbook, may be evaluated to identify at least one acceptable change. The at least one potential change may be identified by (i) proposing, by an administrator, a set of changes based on the issue; (ii) identifying, using the playbook, at least one consequence of applying the set of the changes to the edge device; (iii) making a determination regarding whether the at least one consequence is acceptable; (iv) generating, based on the set of the changes and the playbook, a new playbook, in a first instance of the determination where the at least one consequence is acceptable; and (v) proposing, by the administrator, a new set of changes based on the issue, in a second instance of the determination where the at least one consequence is not acceptable.

The set of the changes, by the administrator and based on the issue, may be proposed by enumerating the set of the changes. The at least one consequence of applying the set of the changes, using the playbook, may be identified by identifying at least one impact of the set of the changes to the playbook. A determination may be made regarding whether the at least one consequence is acceptable by determining if the at least one impact of the set of the changes to the playbook mitigates an impact of the issue.

A new playbook may be generated by implementing the set of the changes to the playbook. The set of the changes to the playbook may initiate a software update to the edge device. The software update may include the set of the changes in an implementation mapping and a vulnerabilities mapping. The implementation mapping and the vulnerabilities mapping may be included in a generation of the new playbook. A new set of changes may be proposed by enumerating the new set of the changes based on the issue.

At operation 306, a new playbook for the edge device may be obtained using the at least one acceptable change. The new playbook may be obtained by (i) identifying a portion of the playbook based on the at least one acceptable change; and (ii) updating the portion of the playbook.

The portion of the playbook based on the at least one acceptable change may be obtained by identifying an implementation mapping of a code base in the playbook where the at least one acceptable change may be implemented. The portion of the playbook may be updated by implementing the at least one acceptable change in the code base and generating a new playbook that includes the at least one acceptable change in the code base.

At operation 308, operation of the edge device, using the new playbook, may be updated to mitigate impact of the issue on the edge device. The operation of the edge device may be updated by implementing, on the edge device, software where the at least one acceptable change has been implemented in the code base of the software.

The method may end following operation 308.

Thus, via the method shown in FIG. 3, embodiments herein may likely improve management of edge systems. By improving the management of the edge systems, the edge systems may be more likely to provide desirable computer implemented services by, for example, streamlining approaches to errors in operation, having an improved security posture, etc.

Figure 4:
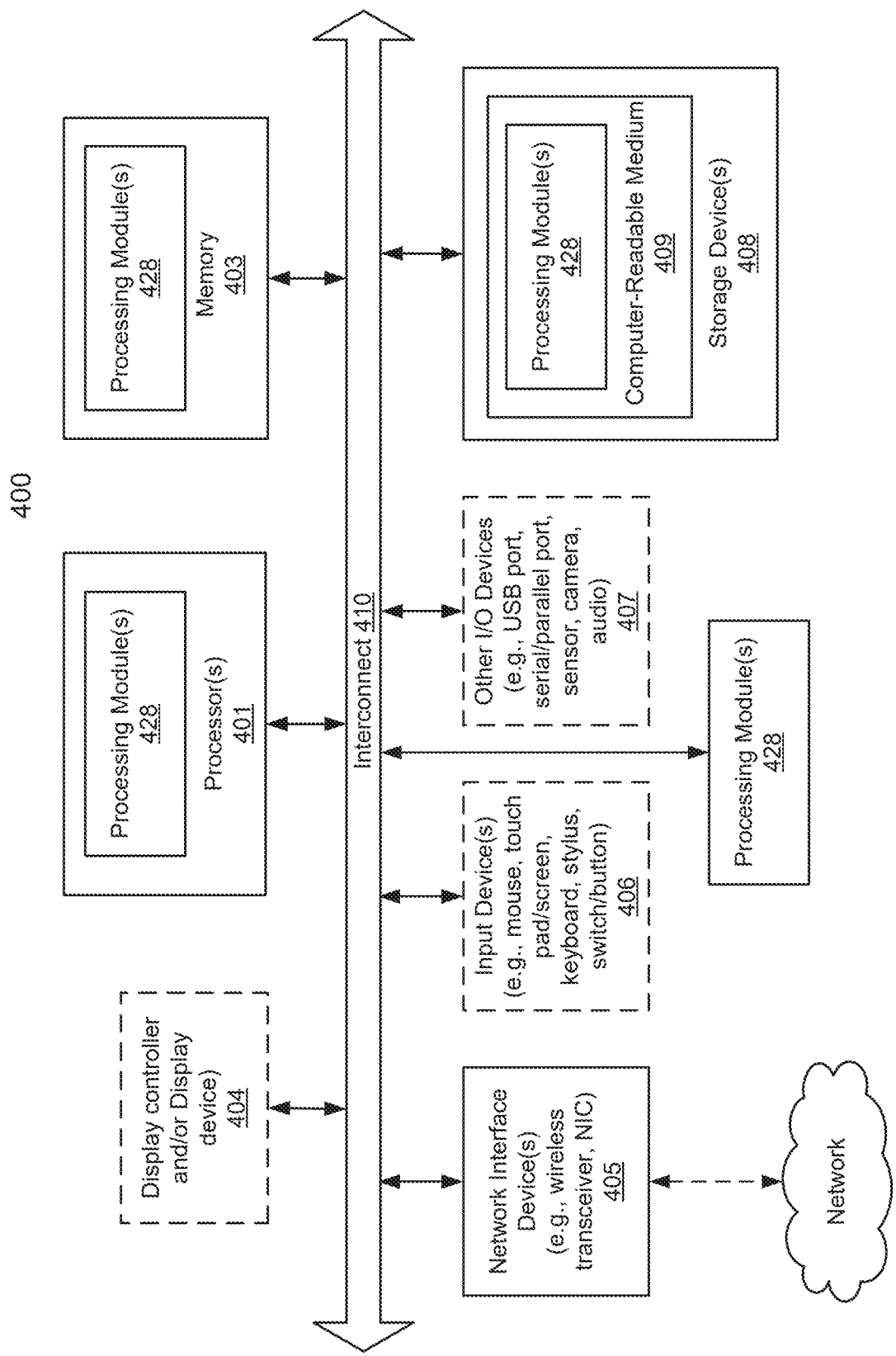
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing edge devices, the method comprising:
   identifying an issue regarding an edge device of the edge devices;
   generating a playbook for the edge device based on a playbook template, wherein generating the playbook comprises:
      traversing a code base of software in a line-by-line manner to determine a capability of the software;
      testing the code base to determine a vulnerability of the software; and
      updating the playbook template based on the capability and the vulnerability of the software;
   evaluating, using the playbook, at least one potential change to the playbook to identify at least one acceptable change to the playbook;
   obtaining, using the at least one acceptable change, a new playbook for the edge device; and
   updating operation of the edge device using the new playbook to mitigate an impact of the issue on the edge device.

2. The method of claim 1, wherein the issue regarding the edge device is based on the vulnerability expressed by the edge device and/or an undesired operation by the edge device.

3. The method of claim 1, wherein the playbook is usable to map issues to the software hosted by the edge device, and the playbook is usable to map how changes to portions of the software impact functionality of other portions of the software.

4. The method of claim 3, wherein the playbook defines the software that is hosted by the edge device and that dictates operation of the edge device.

5. The method of claim 4, wherein the playbook specifies issue mappings between issues and portions of the software, and dependency mappings between the portions of the software and the other portions of the software.

6. The method of claim 1, wherein evaluating at least one potential change to the playbook comprises:
   proposing, by an administrator, a set of changes based on the issue;
   identifying, using the playbook, at least one consequence of applying the set of the changes to the edge device;
   making a determination regarding whether the at least one consequence is acceptable;
   in a first instance of the determination where the at least one consequence is acceptable;
      generating, based on the set of the changes and the playbook, a new playbook; and
   in a second instance of the determination where the at least one consequence is not acceptable:
      proposing, by the administrator, a new set of changes based on the issue.

7. The method of claim 6, wherein the at least one potential change is a change in operation of the software that is listed in the playbook and present on the edge device.

8. The method of claim 1, wherein obtaining the new playbook for the edge device comprises:
   identifying a portion of the playbook based on the at least one acceptable change; and
   updating the portion of the playbook.

9. The method of claim 1, wherein the new playbook comprises the at least one acceptable change.

10. A non-transitory machine-readable medium having instructions stored therein, which when executed by a processor, cause the processor to perform operations for managing edge devices, the operations comprising:
    identifying an issue regarding an edge device of the edge devices;
    generating a playbook for the edge device based on a playbook template, wherein generating the playbook comprises:
       traversing a code base of software in a line-by-line manner to determine a capability of the software;
       testing the code base to determine a vulnerability of the software; and
       updating the playbook template based on the capability and the vulnerability of the software;
    evaluating, using the playbook, at least one potential change to the playbook to identify at least one acceptable change to the playbook;
    obtaining, using the at least one acceptable change, a new playbook for the edge device; and
    updating operation of the edge device using the new playbook to mitigate an impact of the issue on the edge device.

11. The non-transitory machine-readable medium of claim 10, wherein the issue regarding the edge device is based on the vulnerability expressed by the edge device and/or an undesired operation by the edge device.

12. The non-transitory machine-readable medium of claim 10, wherein the playbook is usable to map issues to the software hosted by the edge device, and the playbook is usable to map how changes to portions of the software impact functionality of other portions of the software.

13. The non-transitory machine-readable medium of claim 12, wherein the playbook defines the software that is hosted by the edge device and that dictates operation of the edge device.

14. The non-transitory machine-readable medium of claim 13, wherein the playbook specifies issue mappings between issues and portions of the software, and dependency mappings between the portions of the software and the other portions of the software.

15. The non-transitory machine-readable medium of claim 10, wherein evaluating at least one potential change to the playbook comprises:
 proposing, by an administrator, a set of changes based on the issue;
 identifying, using the playbook, at least one consequence of applying the set of the changes to the edge device;
 making a determination regarding whether the at least one consequence is acceptable;
 in a first instance of the determination where the at least one consequence is acceptable:
  generating, based on the set of the changes and the playbook, a new playbook; and
 in a second instance of the determination where the at least one consequence is not acceptable:
  proposing, by the administrator, a new set of changes based on the issue.

16. A data processing system, comprising:
 a processor; and
 a memory coupled to the processor to store instructions, which when executed by the processor, cause the processor to perform operations for managing edge devices, the operations comprising:
  identifying an issue regarding an edge device of the edge devices;
  generating a playbook for the edge device based on a playbook template, wherein generating the playbook comprises:
   traversing a code base of software in a line-by-line manner to determine a capability of the software;
   testing the code base to determine a vulnerability of the software; and
   updating the playbook template based on the capability and the vulnerability of the software;
  evaluating, using the playbook, at least one potential change to the playbook to identify at least one acceptable change to the playbook;
  obtaining, using the at least one acceptable change, a new playbook for the edge device; and
  updating operation of the edge device using the new playbook to mitigate an impact of the issue on the edge device.

17. The data processing system of claim 16, wherein the issue regarding the edge device is based on the vulnerability expressed by the edge device and/or an undesired operation by the edge device.

18. The data processing system of claim 16, wherein the playbook is usable to map issues to the software hosted by the edge device, and the playbook is usable to map how changes to portions of the software impact functionality of other portions of the software.

19. The data processing system of claim 18, wherein the playbook defines the software that is hosted by the edge device and that dictates operation of the edge device.

20. The data processing system of claim 19, wherein the playbook specifies issue mappings between issues and portions of the software, and dependency mappings between the portions of the software and the other portions of the software.

* * * * *